United States Patent
Yi et al.

(10) Patent No.: US 10,326,568 B2
(45) Date of Patent: Jun. 18, 2019

(54) METHOD AND APPARATUS FOR SUPPORTING FREQUENCY HOPPING FOR LOW COST USER EQUIPMENT IN WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR); Hyangsun You, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 41 days.

(21) Appl. No.: 15/542,874

(22) PCT Filed: Feb. 12, 2016

(86) PCT No.: PCT/KR2016/001453
§ 371 (c)(1),
(2) Date: Jul. 11, 2017

(87) PCT Pub. No.: WO2016/129959
PCT Pub. Date: Aug. 18, 2016

(65) Prior Publication Data
US 2018/0006779 A1   Jan. 4, 2018

Related U.S. Application Data

(60) Provisional application No. 62/115,148, filed on Feb. 12, 2015, provisional application No. 62/143,807, (Continued)

(51) Int. Cl.
*H04L 5/00* (2006.01)
*H04W 4/70* (2018.01)
*H04W 72/04* (2009.01)

(52) U.S. Cl.
CPC .......... *H04L 5/0012* (2013.01); *H04L 5/0044* (2013.01); *H04L 5/0053* (2013.01);
(Continued)

(58) Field of Classification Search
CPC combination set(s) only.
See application file for complete search history.

(56) References Cited

U.S. PATENT DOCUMENTS

2013/0077582 A1* 3/2013 Kim .................... H04W 74/006
370/329
2013/0083753 A1* 4/2013 Lee ................... H04W 72/0453
370/329
(Continued)

FOREIGN PATENT DOCUMENTS

WO   2013104119   7/2013

OTHER PUBLICATIONS

3GPP TSG-RAN WG1 Meeting #79, R1-144563, San Francisco, USA, Nov. 17-21, 2014.*
(Continued)

*Primary Examiner* — Zhitong Chen
(74) *Attorney, Agent, or Firm* — Lee Hong Degerman Kang Waimey

(57) ABSTRACT

A method and apparatus for transmitting a control signal or data for a low cost user equipment (UE) in a wireless communication system is provided. A base station transmits information on frequency hopping for the low cost UE, and transmits the control signal or data to the low cost UE according to the information on frequency hopping.

6 Claims, 8 Drawing Sheets

Related U.S. Application Data filed on Apr. 7, 2015, provisional application No. 62/153,494, filed on Apr. 27, 2015, provisional application No. 62/166,641, filed on May 26, 2015.

(52) U.S. Cl.
CPC ............. *H04L 5/0092* (2013.01); *H04W 4/70* (2018.02); *H04W 72/0406* (2013.01)

(56) References Cited

U.S. PATENT DOCUMENTS

| | | | |
|---|---|---|---|
| 2013/0294399 A1 | 11/2013 | Lee | |
| 2015/0256403 A1* | 9/2015 | Li | H04W 4/70 370/235 |
| 2016/0088594 A1* | 3/2016 | Xiong | H04W 4/70 370/329 |
| 2018/0007585 A1* | 1/2018 | Takeda | H04W 72/042 |

OTHER PUBLICATIONS

PCT International Application No. PCT/KR2016/001453, International Search Report dated Jun. 3, 2016, 2 pages.

LG Electronics, "EPDCCH and PDSCH related issues for MTC", R1-144893, 3GPP TSG RAN WG1 Meeting #79, Nov. 2014, 5 pages.

Ericsson, "SIB transmission for MTC", R1-144563, 3GPP TSG-RAN WG1 Meeting #79, Nov. 2014, 7 pages.

\* cited by examiner

METHOD AND APPARATUS FOR SUPPORTING FREQUENCY HOPPING FOR LOW COST USER EQUIPMENT IN WIRELESS COMMUNICATION SYSTEM

CROSS-REFERENCE TO RELATED APPLICATIONS

This application is the National Stage filing under 35 U.S.C. 371 of International Application No. PCT/KR2016/001453, filed on Feb. 12, 2016, which claims the benefit of U.S. Provisional Applications Nos. 62/115,148, filed on Feb. 12, 2015, 62/143,807, filed on Apr. 7, 2015, 62/153,494, filed on Apr. 27, 2015 and 62/166,641, filed on May 26, 2015, the contents of which are all hereby incorporated by reference herein in their entirety.

BACKGROUND OF THE INVENTION

Field of the Invention

The present invention relates to wireless communications, and more particularly, to a method and apparatus for supporting a frequency hopping for a low cost user equipment (UE) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

Frequency hopping is a special transmission technique sending data with changing carrier frequency in a certain pattern. 3GPP LTE allows two modes for frequency hopping, enabled by higher layer signaling, from one to the other time slot (intra-subframe) and from one to the other subframes (inter-subframe), or just between subframes. Using hopping enables the UE to exploit the frequency diversity of the wideband channel used in 3GPP LTE while keeping the required contiguous allocation.

SUMMARY OF THE INVENTION

The present invention provides a method and apparatus for supporting a frequency hopping for a low cost user equipment (UE) in a wireless communication system. The present invention discusses how to create/handle a UE with limited radio frequency (RF) capability to receive downlink (DL) data successfully serviced by a wideband system bandwidth network.

In an aspect, a method for transmitting, by a base station, a control signal or data for a low cost user equipment (UE) in a wireless communication system is provided. The method includes transmitting information on frequency hopping for the low cost UE, and transmitting the control signal or data to the low cost UE according to the information on frequency hopping.

In another aspect, a base station is provided. The base station includes a memory, a transceiver, and a processor, coupled to the memory and the transceiver, configured to control the transceiver to transmit information on frequency hopping for a low cost user equipment (UE), control the transceiver to transmit the control signal or data to the lost cost UE according to the information on frequency hopping.

A low cost user equipment (UE) can receive downlink (DL) data successfully.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
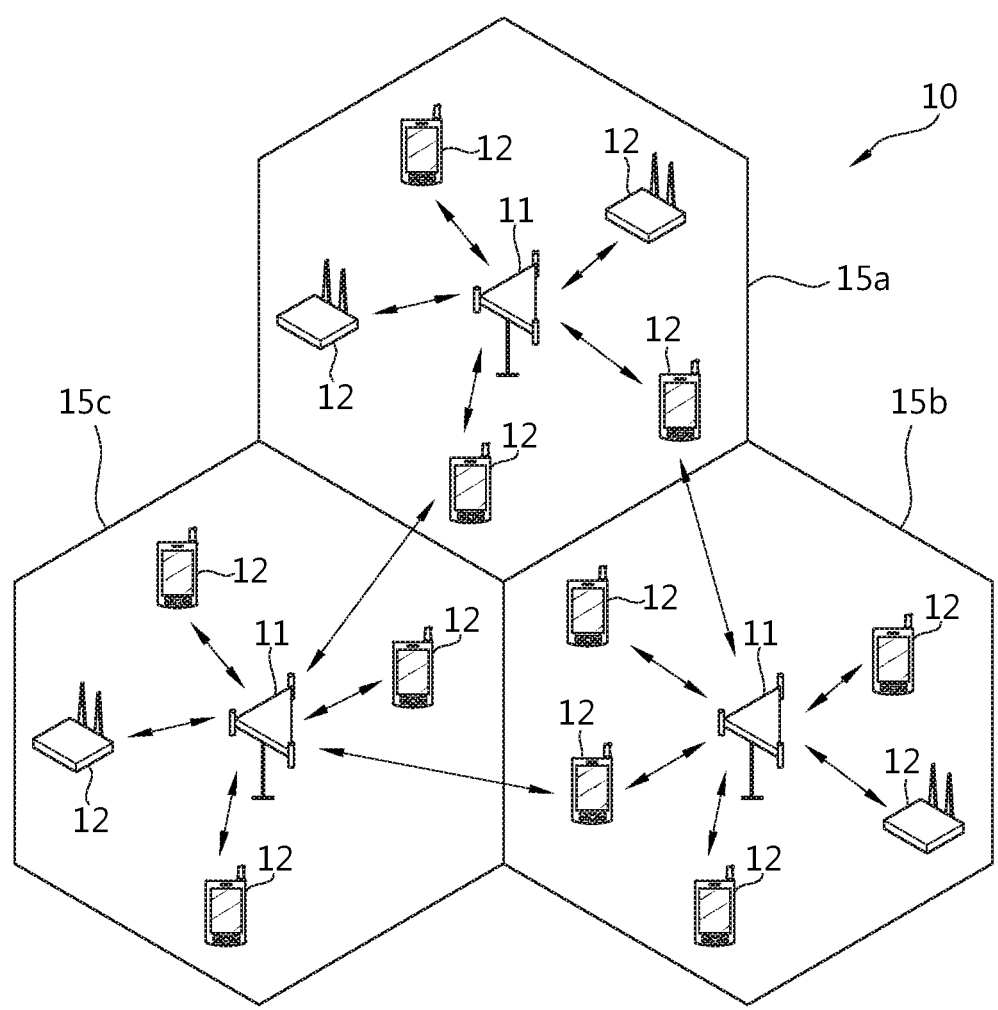
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
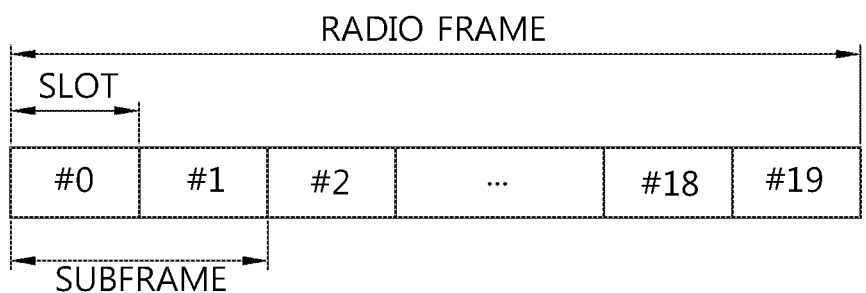
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
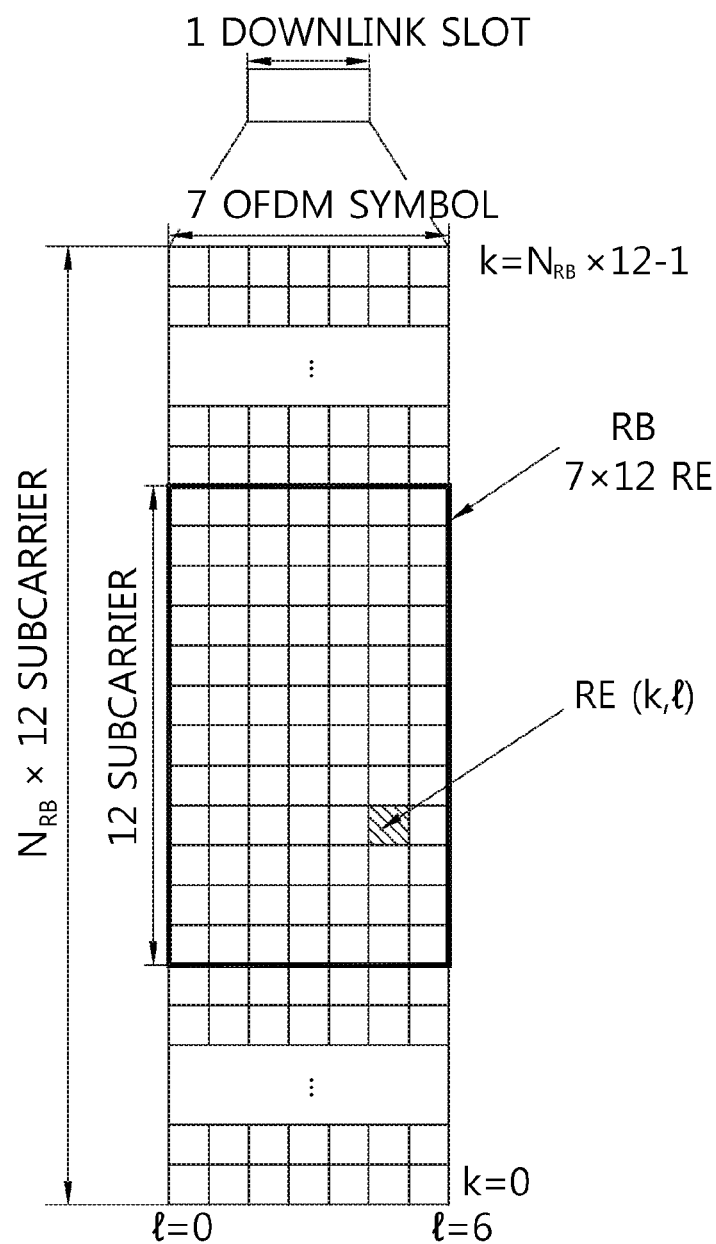
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
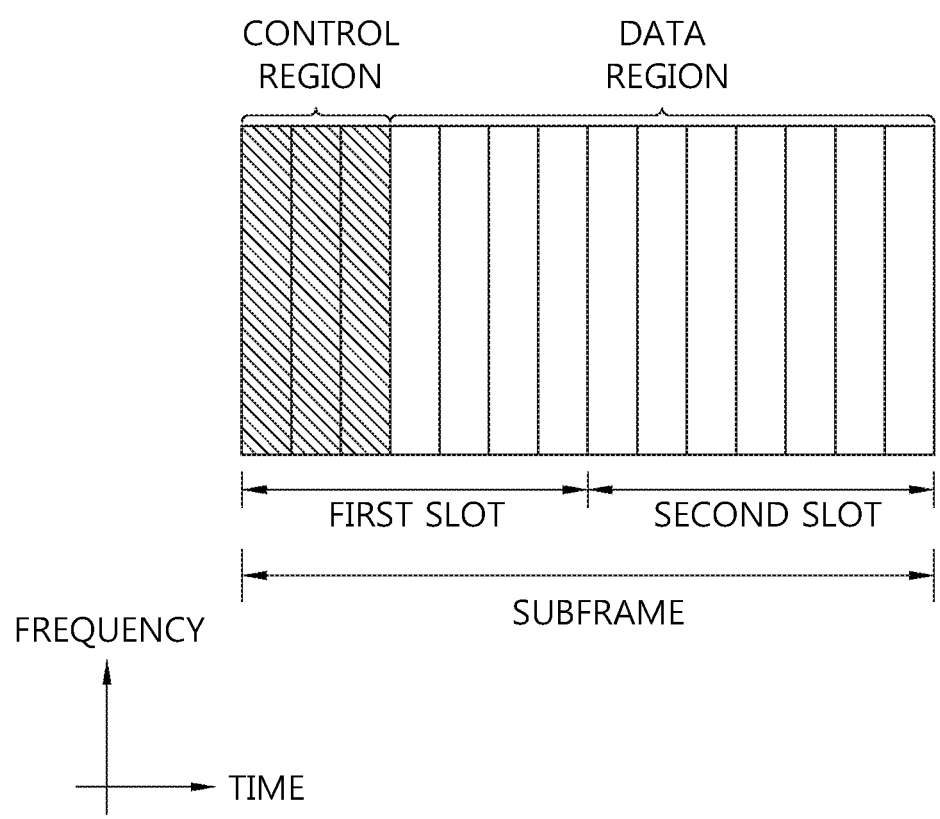
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

Figure 5:
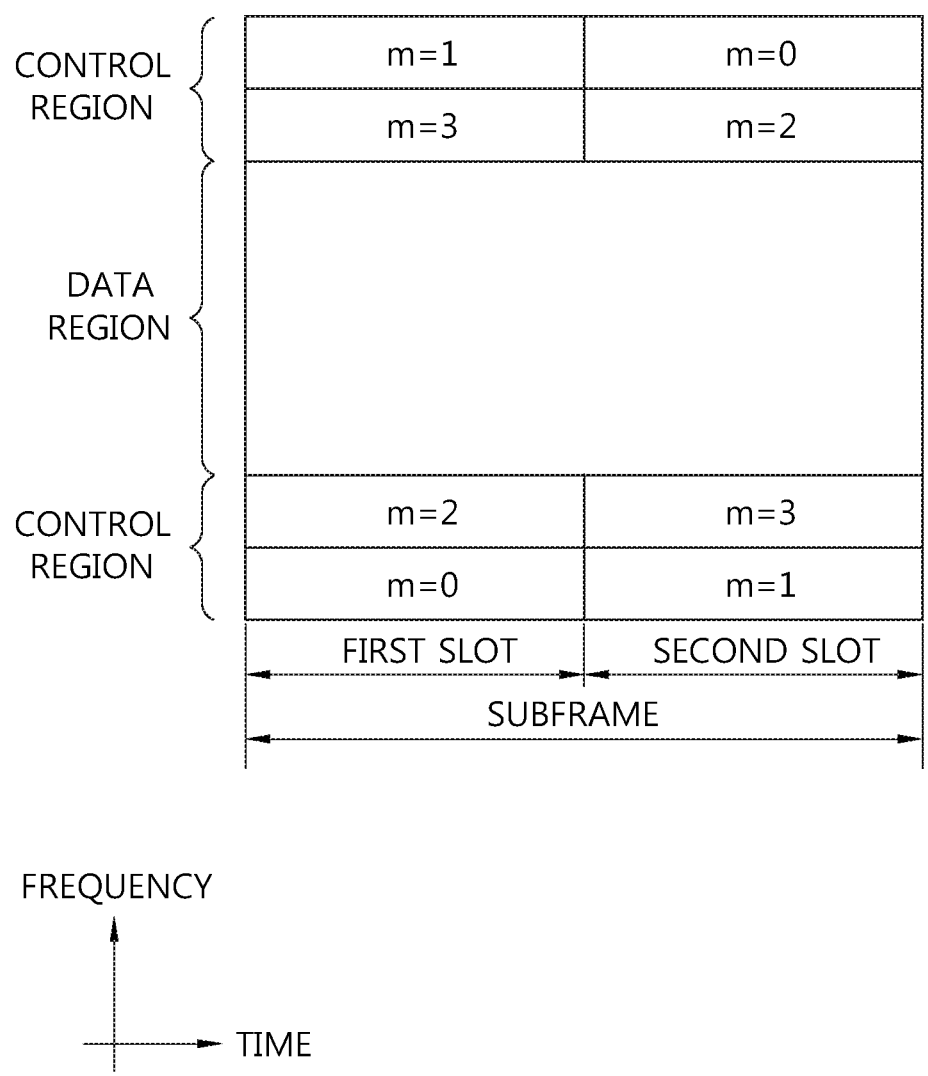
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In the current LTE specification, all UEs shall support maximum 20 MHz system bandwidth, which requires baseband processing capability to support 20 MHz bandwidth. To reduce hardware cost and battery power of the UE used for machine type communication (MTC), reducing bandwidth is a very attractive option. To enable narrow-band MTC UEs, the current LTE specification shall be changed to allow narrow-band UE category. If the serving cell has small system bandwidth (smaller than or equal to bandwidth that narrow-band UE can support), the UE can attach based on the current LTE specification.

Hereinafter, a method for supporting frequency hopping for a low cost UE according to an embodiment of the present invention is proposed. Hereinafter, a low cost UE may be referred to as one of a MTC UE, a UE requiring coverage enhancement (CE), a low end UE, a low complexity UE, a narrow(er) band UE, a small(er) band UE, or a new category UE. Or, just UE may refer one of UEs described above. In the description below, a case where system bandwidth of available cells is larger than bandwidth that new category narrow-band UEs can support may be assumed. For the new category UE, it may be assumed that only one narrow-band is defined. In other words, all narrow band UE shall support the same narrow bandwidth smaller than 20 MHz. It may be assumed that the narrow bandwidth is larger than 1.4 MHz (6 RB). However, the present invention can be applied to narrower bandwidth less than 1.4 MHz as well (e.g. 200 kHz), without loss of generality. Furthermore, in terms of UL transmission, a UE may be configured or scheduled with single or less than 12 tones (i.e. subcarriers) in one UL transmission to enhance the coverage by improving peak-to-average power ratio (PAPR) and channel estimation performance.

For the present invention, the followings may be assumed:

(1) Operating bandwidth of a UE may be known to the eNB. To inform operating bandwidth, multiple approaches may be proposed. It may be assumed that that before scheduling any PDSCH/PUSCH, the eNB knows the operating bandwidth of a UE. In the description below, operating bandwidth in terms of the number of PRBs of a narrow band UE is given as $N_{RB}^{DL\_Op}$. It may be assumed that operating bandwidth is consistent for all narrow band UEs within a cell. Also, UL transmission bandwidth of a narrow band UE may be the same as the DL operating bandwidth i.e. $N_{RB}^{DL\_Op}$. In other words, UL (RF and) baseband can process only narrow band as well.

(2) Operating bandwidth of a UE may be equal to or larger than 1.4 MHz (or 6 RB), and thus, the UE is able to receive physical broadcast channel (PBCH)/primary synchronization signal (PSS)/secondary synchronization signal (SSS) transmitted over center 6 RB of system frequency band. Otherwise, a new signal similar to PBCH/PSS/SSS may be transmitted to narrower bandwidth. Even with supporting 1.4 MHz, it may be expected that a new signal for PBCH/PSS/SSS are considered to support a low cost UE. In this case, the new signal may be called MTC-PBCH, MTC-PSS and MTC-SSS.

(3) The present invention may be applied two scenarios: (1) RF is capable of receiving system bandwidth (e.g., 20 MHz) but baseband is capable of processing only narrowband, (2) both RF and baseband can handle narrow bandwidth. If the first scenario is used, frequency retuning delay is not considered. If the second scenario is used, tuning delay to change frequency should be considered.

(4) The present invention may assume that via RRC signaling (or other means) the UE is notified the number of symbols used for legacy PDCCH (sent over system bandwidth) after serving cell is established. At initial stage, upon receiving PBCH (i.e. discovering system bandwidth), the narrow band UE may configure the default value for the number of symbols for legacy PDCCH to the maximum symbol counts based on system bandwidth (e.g. three for NRBDL=100).

(5) The narrow band UE may support only one LTE band and single radio access technology (RAT). However, it is not precluded to consider inter-RAT handover case for a low cost UE. Just for the simplicity, this invention may assume single-RAT supporting UE.

(6) As the narrow-band UE cannot decode legacy PDCCH, another control channel mechanism (such as enhanced PDCCH transmitted/multiplexed in PDSCH area) may be assumed for supporting narrow band UEs.

In order to allow possibility for the network to enable or disable frequency hopping per UE to transmit DL control signal/data, Frequency hopping may be enabled per subband (subDLBW and/or subULBW). Subband (SubDLBW and/or subULBW) refers a set of PRBs (or bandwidth) that a low cost UE can access at a given subframe. If frequency hopping is disabled for a subband, and the UE is configured with that subband, frequency hopping may not be used in that subband. For example, center 6 PRBs may not be subject to frequency hopping regardless of other subbands. In terms of frequency hopping, those subbands may not be used as a candidate location to hop. In other words, frequency hopping may occur around those PRBs due to disabling of frequency hopping. There may be one or more subbands for which frequency hopping is not applied. In this case, those subbands may be placed either in the first or end of subband indices such that frequency hopping may not be affected by those subbands for which frequency hopping is not applied. In that case, a network may configure the number of subbands for which frequency hopping is not applied to a UE. Frequency hopping may be performed across subbands for which frequency hopping is applied.

Alternatively, a UE may be configured with frequency hopping or no frequency hopping, and the network may maintain frequency hopping decision by proper mapping of subbands. To support this, index of subband may not increase with increase of index of PRB. A virtual mapping between subband index and physical subband may also be considered where some virtual mapping function may also be considered.

Signaling of subband configuration for frequency hopping is described. It may be assumed that a set of subbands are usable for MTC transmission, both in normal coverage and enhanced coverage by CE.

Separate subband configuration per normal coverage UEs and CE UEs may be considered. However, unless configured separately, a UE may assume that subbands are commonly configured for both normal coverage UEs and CE UEs.

Separate subband configuration for cell broadcast data (i.e. common data) and unicast data may be considered. In order to minimize the reconfiguration, separate subband configuration/hopping pattern for common data and unicast data may be considered. However, unless configured separately, a UE may assume that subbands and hopping patterns are commonly used for both common data and unicast data.

If common data and unicast data utilizes different subbands, a subband offset may be configured to indicate how many subbands are used for common data starting from the edge of subbands. For example, the total number of PRBs may be divided to multiple subbands starting from the edge of PRBs, or following a set of rules. The subband which has the lowest PRB index among all subbands has the lowest subband index (i.e. 0), and the subband which has the highest PRB index among all subbands has the second lowest subband index (i.e. 1). Thereafter, the subband which has the lowest PRB index among the remaining subbands is assigned with subband index=2, and the subband which has the highest PRB index among the remaining subbands is assigned with subband index=3, and so on. The subband offset may be given as, e.g. 0, 2, 4, etc. The subband offset of 0 may mean that all subbands are usable for unicast data. The subband offset of 2 may mean that 2wo subbands are reserved for common data, and the subband offset of 4 means that 4 subbands (two subbands from each direction) are reserved for common data. Those reserved subbands may not be used for frequency hopping for unicast data. Or, explicit indication of subbands for common data may be configured. If common data and unicast data occurs in the same subband, it may be assumed that a set of subframes are indicated where unicast data transmissions can occur.

If a set of subbands are used for common data, frequency hopping for common data may occur within those subbands configured for common data only. These subbands for common data may be configured by master information block (MIB). If subbands for SIB1 and/or paging are separated from subbands for other common data, subbands for common data may be indicated by SIB1.

Separate subband configuration for paging and/or SIB1 transmission may be considered. If paging is used to indicate update of SIB, the location of paging transmission should not be changed, and need to be prefixed. Thus, in terms of time/frequency resources, location of paging transmission needs to be fixed. To support this, separate subbands may be reserved for paging transmission. For example, if frequency hopping is not used, edge 6 PRBs or center 6 PRBs may be reserved for paging transmission. If frequency hopping is used, two 6 PRBs in each edge may be reserved for paging and/or SIB1 transmission, and frequency hopping may occur between two 6 PRBs. Or, if frequency hopping is used, one edge 6 PRBs and center 6 PRBs may be reserved for paging and/or SIB1 transmission, and frequency hopping may occur between two 6 PRBs. If odd system bandwidth is used, only center 5 PRBs may be used. Or, two or more subbands used for paging and/or SIB1 transmission may be indicated explicitly.

Figure 6:
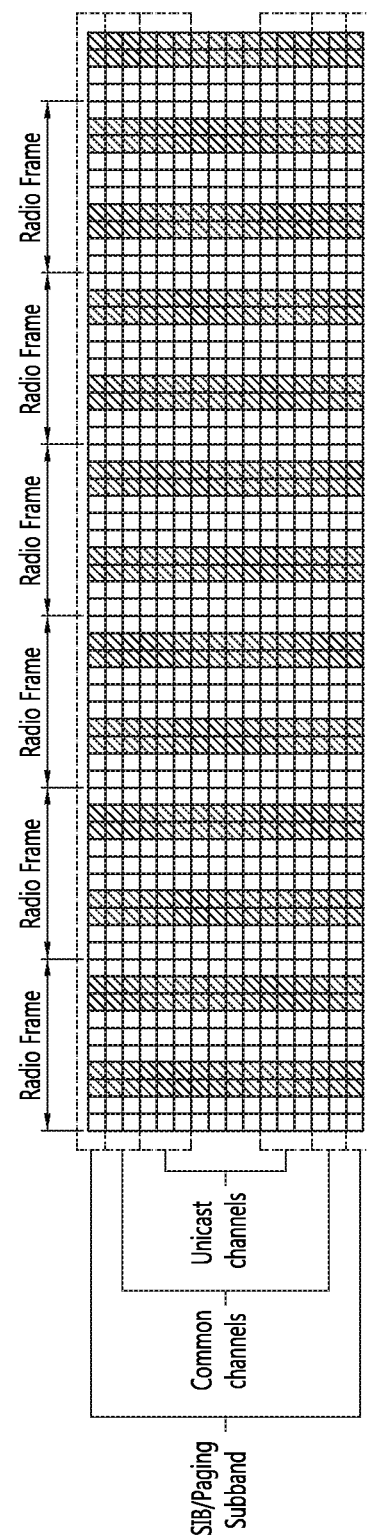
FIG. 6 shows an example of frequency hopping for a low cost UE according to an embodiment of the present invention.

FIG. 6 shows an example of frequency hopping for a low cost UE according to an embodiment of the present invention. Referring to FIG. 6, the first and last subband (in terms of PRB index, i.e. subband index 0 and 1) are used for paging and/or SIB1 transmission. Further, 4 subbands are reserved for common data transmission. The number of subbands reserved for common data may be signaled by SIB1. 4 subbands for common data may be used for random access response (RAR) and SIB transmissions. Further, 6 subbands are used for unicast data transmission.

Overall, all subbands may be used for unicast data and common data. Even in that case, a UE may assume that paging and/or SIB1 may occur in the edge two PRBs in a given set of subframes (e.g. in subframe #5 in every 20 ms for SIB1, and paging occasions for paging). When unicast data transmission collides with paging and/or SIB1 transmission in a specific subframe/subband, a UE may assume that unicast transmission may not occur (i.e. paging and/or SIB1 has the higher priority). In other words, a UE may not assume any unicast data transmission in resources reserved for paging and/or SIB1 transmission (including paging to all UEs) regardless whether paging and/or SIB1 is actually transmitted or not.

In summary, for paging and/or SIB1 transmission, it may be assumed that a prefixed set of resources are reserved. For example, if frequency hopping is not used, center 6 PRBs may be fixed for resources for paging and/or SIB1 transmission. Or, if frequency hopping is used, edge two subbands may be reserved for resources for paging and/or SIB1 transmission. The network may enable frequency hopping by indicating that in MIB, and if frequency hopping is enabled, a UE may assume that frequency hopping for paging and/or SIB1 is also enabled. Otherwise, a UE may assume that all transmission does not utilize frequency hopping. Alternatively, frequency hopping for paging and/or SIB1 may be configured independently from frequency hopping for unicast data. In this a case, different frequency hopping may also be utilized. Unicast data transmission may collide with reserved resources for paging and/or SIB1 transmission. In case of collision, a UE may assume no unicast data transmission in those resources.

In terms of signaling for frequency hopping, the following signaling may be considered. Since it is generally desirable to fix the frequency/time location of paging transmission, the same frequency (in different time) may be used for SIB1 transmission. At least, frequency resource for paging transmission may not be changed once it is configured by SIB1 and/or other SIB.

(1) MIB may include an indication of whether frequency hopping is enabled or not for low cost UE. Further, MIB may include a bitmap to indicate which subbands are used for SIB1 transmission from prefixed subbands. For example, the first bit (bit 0) of the bitmap may indicate center 6 PRBs (or 5 PRBs in odd system bandwidth), the second bit (bit 1) of the bitmap may indicate the first edge subband, and the third bit (bit 2) of the bitmap may indicate the second edge subband. Other reserved/prefixed subbands (which may be defined differently per system bandwidth) may also be used. Alternatively, one bit may be used to select a pattern from prefixed/predefined sets of subband. For example, two sets of subbands may be defined, in which the first set is center 6 PRBs for which frequency hopping is not applied and the second set is two edge 6 PRBs for which frequency hopping is applied. When 0 is indicated by the one bit, the first set may be used, and when 1 is indicated by the one bit, the second set may be used.

Further, MIB may include hopping pattern of SIB1. Or, MIB may include a starting subband to start frequency hopping at SFN=0. If frequency hopping pattern is not indicated, prefixed frequency hopping pattern (which is function of cell ID and SFN) may be used. Further, MIB may include an offset and the number of subbands (i.e. sub-DLBW) used for cell broadcast transmission. In this case, it may be assumed that SIB is transmitted in the first sub-DLBW starting from the offset. In MIB, since location of SIB may be fixed, only offset may be configured. Further, MIB may include transport block size (TBS) of SIB.

A tentative set of bits used in MIB may be as follows.
1 bit of LC support: whether the network supports low complexity UEs
2 bits of CE level support: the maximum CE level that the network supports
1 bit of SIB narrowband location: either offset or indication of the location of SIB1
3 bits of TBS of SIB (2) SIB may include starting subbands usable for unicast data or a bitmap of subbands usable for unicast data. SIB may further include frequency hopping pattern. SIB may further include set of subframes usable for unicast data. SIB may further include set of subframes usable for common data. SIB may further include resource mapping between physical random access channel (PRACH) resource and RAR. SIB may further include resource mapping between PRACH/RAR and message 3/4.

Figure 7:
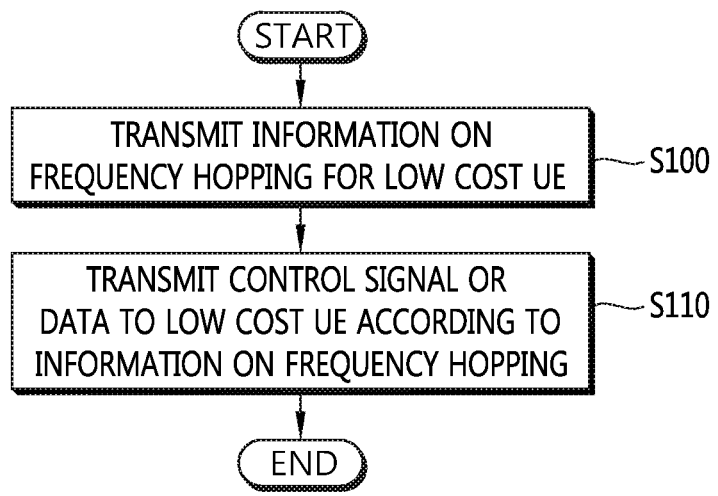
FIG. 7 shows a method for transmitting a control signal or data for a low cost UE according to an embodiment of the present invention.

FIG. 7 shows a method for transmitting a control signal or data for a low cost UE according to an embodiment of the present invention. Above description of the present invention may be applied to this embodiment.

In step S100, the BS transmits information on frequency hopping for the low cost UE. The information on frequency hopping may be transmitted via MIB or SIB. The information on frequency hopping may indicate whether or not the low cost UE is configured with frequency hopping. The information on frequency hopping may include a first frequency hopping configuration for the control signal and a second frequency hopping configuration for the data. That is, frequency hopping for the control signal and frequency hopping for the data may be configured independently. Further, the information on frequency hopping may include a third frequency hopping configuration for the cell broadcast data and a fourth frequency hopping configuration for the unicast data. That is, frequency hopping for the cell broadcast data and frequency hopping for the unicast data may be configured independently.

In step S110, the BS transmits the control signal or data to the low cost UE according to the information on frequency hopping. The control signal may include at least one of paging SIB. A prefixed frequency hopping pattern may be determined based on at least one of a cell ID, an offset or a SFN, and the SIB may be transmitted by the prefixed frequency hopping pattern. Alternatively, the information on frequency hopping may include a frequency hopping pattern for the SIB, and the SIB may be transmitted by the frequency hopping pattern. The information on frequency hopping may indicate an offset and a number of subbands used for cell broadcast data. The at least one of the paging or the SIB1 may be transmitted on fixed subbands. The fixed subbands may correspond to center 6 PRBs of a system bandwidth or two subbands in edge of the system bandwidth. Frequency hopping may be used between the two subbands in edge of the system bandwidth. The data may include at least one of cell broadcast data or unicast data.

Figure 8:
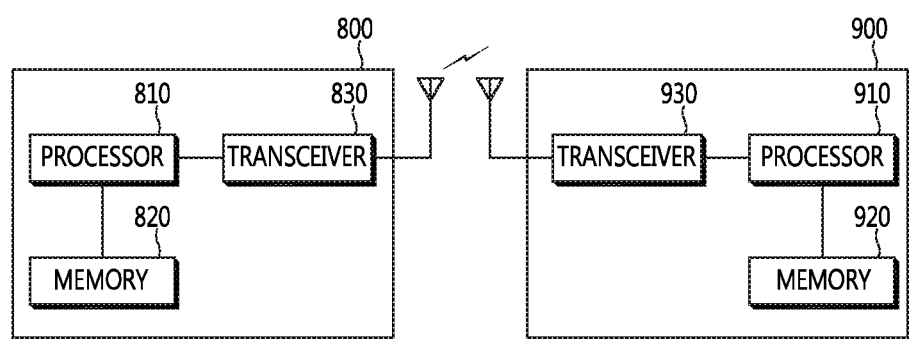
FIG. 8 shows a wireless communication system to implement an embodiment of the present invention.

FIG. 8 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A low cost UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting, by a base station, a control signal for a low cost user equipment (UE) in a wireless communication system, the method comprising:
    transmitting, to the low cost UE, master information block (MIB) information on whether frequency hopping is enabled or not for the low cost UE;
    if the frequency hopping is enabled for the low cost UE, transmitting the control signal to the low cost UE via fixed two subbands in respective edges of a system bandwidth,
    wherein the frequency hopping is used amongst the fixed two subbands; and
    if the frequency hopping is not enabled for the low cost UE, transmitting the control signal to the low cost UE via one or more center subbands of the system bandwidth, the one or more center subbands located between the fixed two subbands,
    wherein the control signal includes at least one of a paging or a system information block (SIB).

2. The method of claim 1,
    wherein a prefixed frequency hopping pattern is determined based on at least one of a cell identifier (ID), an offset or a system frame number (SFN), and
    wherein the SIB is transmitted by the prefixed frequency hopping pattern.

3. The method of claim 1, wherein the MIB includes a frequency hopping pattern for the SIB, and
    wherein the SIB is transmitted by the frequency hopping pattern.

4. The method of claim 1, wherein the MIB includes an offset and a number of subbands used for cell broadcast data.

5. The method of claim 1, further comprising:
    transmitting, to the low cost UE, the SIB including a set of subframes usable for unicast data and a set of subframes usable for common data.

6. A base station comprising: a memory; a transceiver; and a processor, coupled to the memory and the transceiver, configured to: control the transceiver to transmit, to a low cost UE, master information block (MIB) including information on whether frequency hopping is enabled or not for the low cost UE: if the frequency hopping is enabled for the low cost UE, control the transceiver to transmit the control signal to the low cost UE via fixed two subbands in respective edges of a system bandwidth, wherein the frequency hopping is used amongst the fixed two subbands; and if the frequency hopping is not enabled for the low cost UE, control the transceiver to transmit the control signal to the low cost UE via one or more center subbands of the system bandwidth, the one or more center subbands located between the fixed two subbands, wherein the control signal includes at least one of a paging or a system information block (SIB).

* * * * *